United States Patent [19]

Frei

[11] Patent Number: 5,622,099

[45] Date of Patent: Apr. 22, 1997

[54] BREWING HEAD OF AN ESPRESSO MAKER

[75] Inventor: Hans-Peter Frei, Oetwil am See, Switzerland

[73] Assignee: Eugster/Frismag AG, Romanshorn, Switzerland

[21] Appl. No.: 681,985

[22] Filed: Jul. 30, 1996

[30] Foreign Application Priority Data

Jul. 31, 1995 [EP] European Pat. Off. .............. 95111981

[51] Int. Cl.⁶ ..................................................... A47J 31/34
[52] U.S. Cl. ...................... 99/287; 99/289 R; 99/289 P; 99/302 P
[58] Field of Search ................................. 99/287, 289 R, 99/289 D, 289 P, 292, 295, 297, 300, 302 R, 302 P; 426/433

[56] References Cited

U.S. PATENT DOCUMENTS

| | | | |
|---|---|---|---|
| 3,266,410 | 8/1966 | Novi et al. | 99/287 |
| 4,188,863 | 2/1980 | Grossi | 99/289 R |
| 4,941,399 | 7/1990 | Zucchetti | 99/289 P |
| 5,465,649 | 11/1995 | Muis | 99/289 P |

FOREIGN PATENT DOCUMENTS

| | | |
|---|---|---|
| 0192797 | 9/1986 | European Pat. Off. . |
| 0270141 | 6/1988 | European Pat. Off. . |
| 0443054 | 8/1991 | European Pat. Off. . |
| 0536616 | 4/1993 | European Pat. Off. . |
| 3422432 | 12/1985 | Germany . |
| 2008394 | 6/1979 | United Kingdom . |

*Primary Examiner*—Robert W. Jenkins
*Attorney, Agent, or Firm*—Spencer & Frank

[57] ABSTRACT

A brewing head of an espresso maker includes a housing, and a lower brewing head section fixedly attached to the housing. The lower brewing head section includes a pressure sealed brewing chamber, and a lifting piston forming a floor of the brewing chamber. The lifting piston has apertures therethrough. A water inlet is located beneath the floor of the brewing chamber. An apparatus for moving the lifting piston is provided. The brewing head further includes an upper brewing head section movable relative to the lower brewing head section. The upper brewing head section includes an upper brewing head housing, and a fill shaft. The fill shaft is in communication with the brewing chamber when the upper brewing head section is moved to a fill position. The upper brewing head section further includes a brewing piston positioned over the brewing chamber when the upper brewing head section is moved to a brewing position. The brewing piston includes a coffee outlet in communication with the brewing chamber when the upper brewing head section is in the brewing position. The upper brewing head section further includes an apparatus for plunging the brewing piston into the brewing chamber when the upper brewing head section is in the brewing position. Moreover, the upper brewing head section includes a clearing element immovably secured to the upper brewing head housing for clearing the brewing chamber of used ground espresso when the upper brewing head section is moved to a clearing position.

13 Claims, 6 Drawing Sheets

BREWING HEAD OF AN ESPRESSO MAKER

CROSS-REFERENCE TO RELATED APPLICATIONS

This application claims the priority of European Application No. EP 95 111 981.7 filed on Jul. 31, 1995, which is incorporated herein by reference.

BACKGROUND OF THE INVENTION

The present invention relates to a brewing head of an espresso maker. The brewing head includes a pressure sealed brewing chamber, and a movable lifting piston forming a floor of the brewing chamber. The movable lifting piston has apertures therethrough. A fill opening is in communication with the brewing chamber for supplying the brewing chamber with fresh ground espresso. A water inlet is provided for feeding hot water through the apertures and into the brewing chamber. The movable lifting piston lifts a cake of used ground espresso located thereon up to an upper edge of the brewing chamber after brewing the espresso. A clearing element laterally pushes the cake off from the lifting piston after the cake is moved to the upper edge of the brewing chamber by the lifting piston, so as to clear the brewing chamber of used ground espresso.

Such an espresso maker is described by European Patent No. 0 443 054. In this known espresso maker, the water supply and the clearing blade are arranged on a carriage which is linearly displaceable above the brewing chamber. The brewing process of this device occurs at a pressure of approximately 12 bar.

A cake of leached espresso grounds is lifted by the lifting piston, and laterally transported off the lifting piston, by a semicircular-shaped clearing element disposed on the aforementioned carriage.

The inlet for the hot water is configured as a flexible hose, which represents a source of danger because of the very high pressure involved.

This known espresso maker has several drawbacks. For example, during the brewing process, the brewing chamber and the carriage must be sealed from each other. Seals are used which are located in a region of a sliding plane between the brewing chamber and carriage, and are therefore subjected to heavy wear. Further, the linear, reciprocating movement of the carriage also requires a very complicated mechanical control system and a flexible water supply (i.e., a flexible hose). Moreover, the water supply is also under a pressure of 12 bar, and therefore represents a source of danger.

SUMMARY OF THE INVENTION

It is therefore an object of the present invention to provide a brewing head of the aforementioned type, but without the sealing problems in the region of the brewing chamber.

It is yet another object of the present invention to simplify the mechanical control system.

It is a further object of the present invention to provide an espresso maker that is safe to operate, and that produces a high quality espresso.

These objects and others are accomplished according to the invention in that the brewing head is configured in two sections: a lower brewing head section fixedly attached to the housing, and an upper brewing head section movable relative to the lower brewing head section. The lower brewing head section includes the brewing chamber, the lifting piston, the water inlet, and means for moving the lifting piston to lift a cake of used ground espresso located thereon up to an upper edge of the brewing chamber after brewing the espresso. The upper brewing head section includes the fill shaft, and a brewing piston positioned over the brewing chamber when the upper brewing head section is moved to a brewing position. The brewing piston includes the coffee outlet, which is in communication with the brewing chamber when the upper brewing head section is in a brewing position for dispensing brewed espresso. The upper brewing head section further includes means for plunging the brewing piston into the brewing chamber when the upper brewing head section is in the brewing position. Moreover, the upper brewing head section includes the clearing element, which is immovably secured to the upper brewing head housing for clearing the brewing chamber of used ground espresso when the upper brewing head section is moved to a clearing position.

Thus, the brewing head of the espresso maker according to the invention is divided into two functional units. The lower brewing head section is stationary, and comprises the brewing chamber and the lifting piston. The lifting piston is typically controlled by a turning motion of the upper brewing head section for the elimination of the leached (used) coffee grounds.

The upper brewing head section preferably forms a carrousel, and is rotatable by 360° with respect to the stationary lower brewing head section. The upper brewing head section comprises a brewing piston, which plunges into the brewing chamber during the brewing process, and a clearing blade. The clearing blade transports the coffee grounds, which are lifted out of the brewing chamber by the controlled lifting piston, into a disposal opening using a turning motion of the upper brewing head section.

The division of the brewing head into two sections is advantageous because the brewing head can be easily cleaned by placing the carrousel in a specific turning position, whereby the upper brewing head section can be easily removed from the lower brewing head section.

Further, the invention allows the ground coffee filled into the brewing chamber to be compacted in a very simple manner. The compacting of the coffee improves the quality of the espresso drink. To accomplish this, the brewing piston is pushed downward onto the ground espresso within the brewing chamber. This pushing movement is carried out using a suitable lever, which is preferably manually operated. The lever is seated in the upper brewing head section, and is connected to the movable upper section of the brewing piston.

A simple O-ring on the outer perimeter of the cylindrical-shaped lower section of the brewing piston provides the seal between the upper brewing head section and the lower brewing head section. During operation, this seal is subjected to little wear and therefore has a very long life, compared to the aforementioned known espresso makers.

Preferably, the clearing element according to the invention comprises a clearing blade having an obtuse-angled (V-shaped) profile with respect to the cake. Therefore, while the cake is being pushed away, the clearing blade touches the cake only in two points so that the cake can separate more easily from the clearing blade. In the prior art, however, contact takes place over the entire surface of the clearing device, because the profile of both the clearing blade and the cake is identical, i.e., circular-shaped.

Similar to aforementioned known espresso maker, the brewing head according to the present invention can, in principle, operate linearly. However, preferably the upper brewing head section is configured as a carrousel that is rotatable about a circular path relative to the lower brewing head section. This circular motion can simultaneously be used in a forced control system for actuating the lifting piston, which can be configured more simply than the system disclosed by the aforementioned known espresso maker. Further, the circular motion can be used to move the clearing blade along a circular track. Thus, the clearing blade fulfills its purpose in a predetermined, sequential manner.

The coffee outlet preferably includes a valve (crema) located therein. The valve opens for dispensing the brewed espresso when a specific excess pressure is present in the brewing chamber. This configuration offers the advantage that a certain pressure must first build up in the brewing chamber before the finished espresso is released from the brewing chamber, thus improving the quality of the brewed espresso.

Preferably, the coffee outlet also includes a suction valve located therein. The suction valve opens when a specific vacuum is present in the brewing chamber. The suction valve thus aspirates back any remaining coffee brew left in the outlet, and therefore prevents the espresso from dripping from the outlet.

As mentioned, the brewing piston is preferably lifted or lowered via a manually operated lever. To maintain the brewing piston in its lowered position for a sufficient period of time during the brewing process, it is preferred that the upper brewing head section includes detent connection means that is engageable for holding the lever and the brewing piston in the lowered position, and that is disengageable for releasing the lever and the brewing piston from the lowered position once the brewing process is finished. Once disengaged, the brewing piston can then be lifted using the lever, preferably by hand.

Preferably, the rotation of the upper brewing head section in the manner of a carrousel occurs manually, but it may also be motor-driven. It is also conceivable to control the motion of the brewing piston using a motor, although, as mentioned, using a manual movement and the aforementioned lever is preferred.

As noted, the known espresso maker requires that the inlet for the hot water be configured as a flexible hose. As mentioned, this presents a source of danger, because the hose is subjected to a very high pressure, which may cause the hose to burst. To eliminate this danger, it is preferred that the water inlet comprises a fitting having an end attached to a base of the brewing chamber. Thus, since the inlet for the hot water merges into the lower brewing head section, no flexible hose is necessary. To accomplish this purpose, the fitting (i.e. a pipe connection) is connected to a hot water source using a fixed pipe fitting, which is composed of a material that can withstand the prevailing pressure without any problems, even after long operating periods.

The invention will be described below in greater detail in connection with an embodiment thereof that is illustrated in the drawing figures.

DETAILED DESCRIPTION OF THE PREFERRED EMBODIMENTS

Referring to the Figures, and particularly FIGS. 7–10, the brewing head is comprised of a lower brewing head section 1 and an upper brewing head section 2. The lower brewing head section 1 has an upper side fixedly attached to a housing 43 (FIGS. 1–4). The upper brewing head section 2 can rotate relative to the lower brewing head section 2 in the direction of the arrow shown in FIG. 7, in the manner of a carrousel. To accomplish this rotation, a drive may be provided (not shown), or alternatively, the rotation may be effected manually, with the various function positions being indicated by detents (not shown). If the rotation is motor-driven, a control system may be provided for stopping the rotatable upper brewing head section 2 at specific angular positions, so that the functions described below, such as filling, brewing and eliminating the cake, can be implemented. The following text explains the general functioning of an espresso maker having a brewing head according to the invention.

A fill shaft 3 is provided on an upper brewing head housing 2'. Fresh, ground espresso (ground coffee) is filled into a brewing chamber 4 through fill shaft 3 when the fill shaft is disposed above the brewing chamber 4. This position occurs when the upper brewing head section 2 is moved to the fill position shown in FIGS. 2 and 7.

Figure 3:
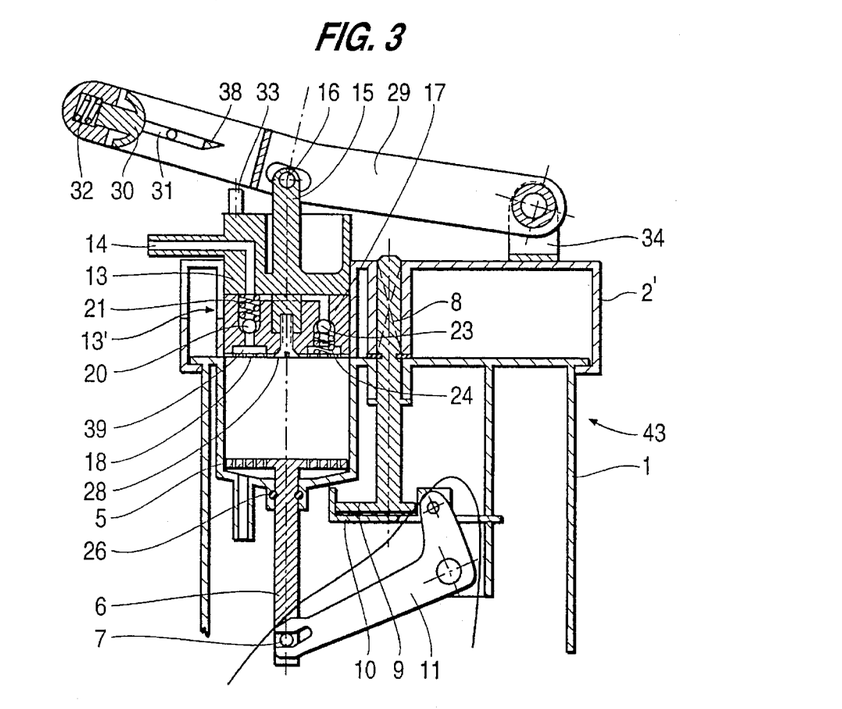
FIG. 3 is a partial sectional, elevational view of the brewing head, with the upper brewing head section being rotated by approximately 120° with respect to the position shown in FIG. 2, illustrating a position in which the brewing piston is positioned above the brewing chamber and the lifting piston is lowered.
Figure 4:
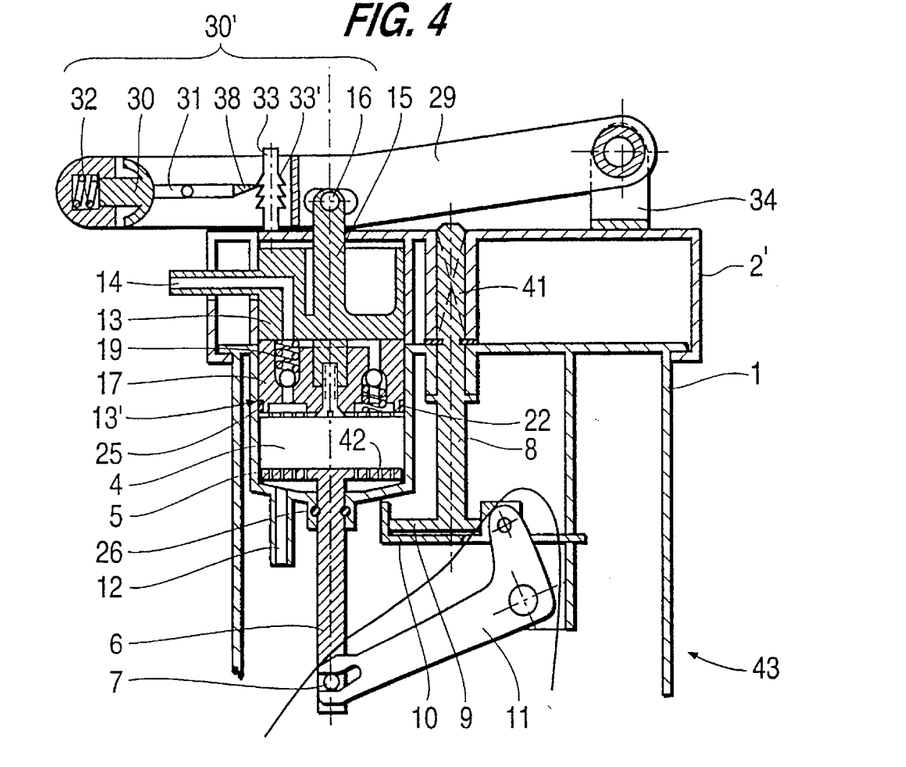
FIG. 4 is a partial sectional, elevational view, with the upper brewing head section being located in the position shown in FIG. 3, and with the brewing piston being located in the brewing chamber.

The upper brewing head section 2 includes a brewing piston 13', as best shown in FIGS. 3 and 4. Brewing piston 13' in turn includes an upper section 13, and a lower section 17.

Figure 1:
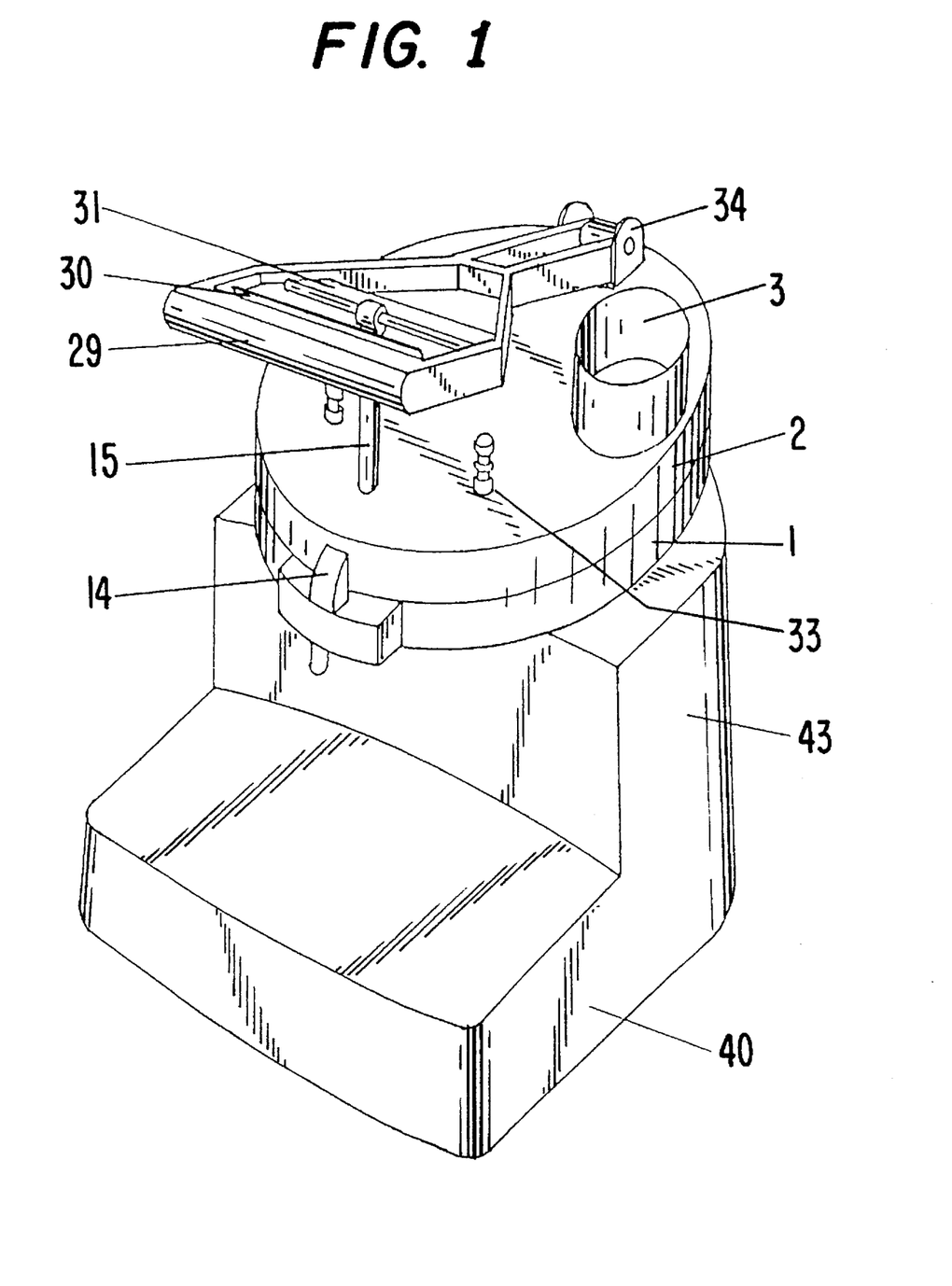
FIG. 1 is a perspective view of an espresso maker provided with a brewing head according to the invention.
Figure 2:
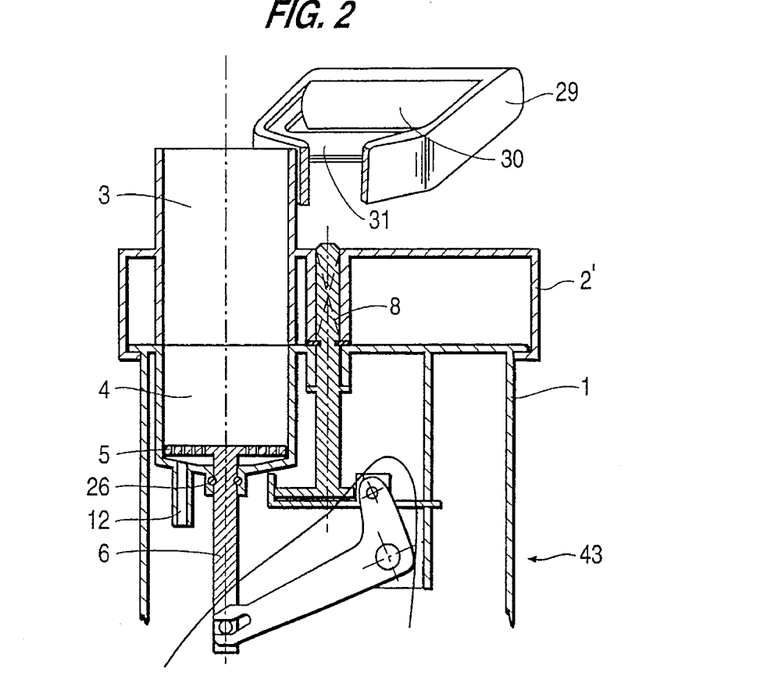
FIG. 2 is a sectional, elevational view of the brewing head according to the invention, showing a fill position in which the fill shaft of the upper brewing head section is located above the brewing chamber and the lifting piston is lowered.
Figure 7:
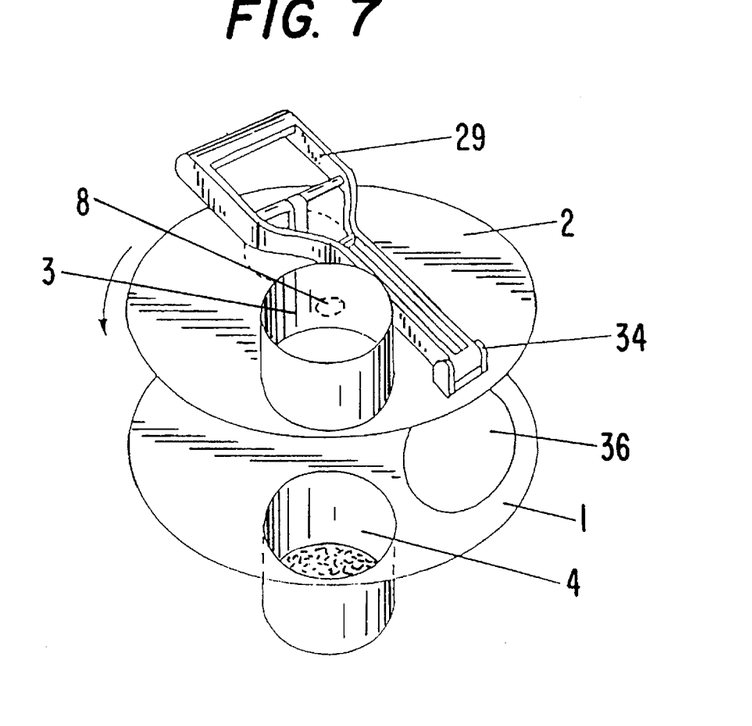
FIG. 7 is a perspective fundamental representation of the position of the brewing head shown in FIG. 2.
Figure 8:
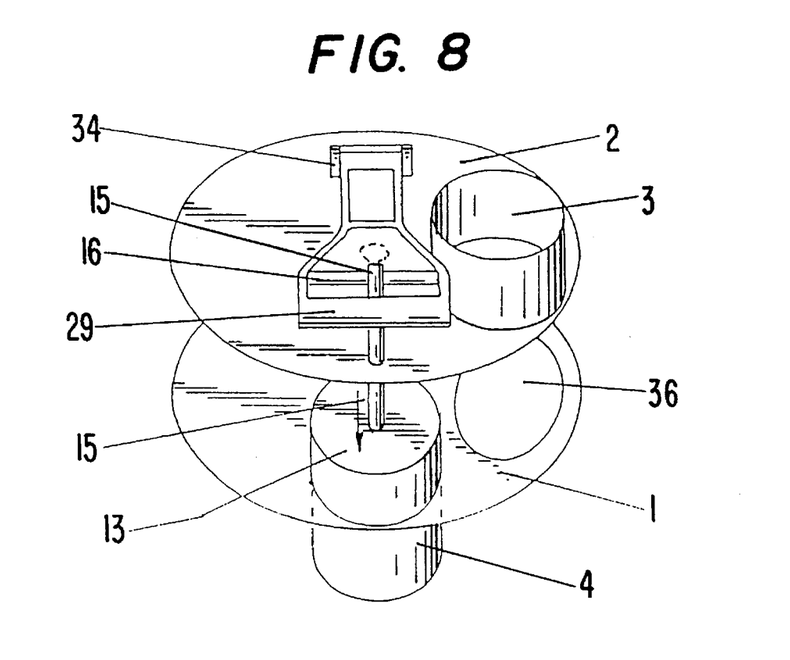
FIG. 8 is perspective fundamental representation of the position of the brewing head shown in FIG. 3.

FIGS. 3 and 8 show a position which, in comparison to FIGS. 2 and 7, is turned by approximately 120°, so that brewing piston 13' is disposed above the brewing chamber 4. The bottom or floor of the brewing chamber, upon which the coffee grounds are placed, is formed by a lifting piston 5, which is illustrated in these Figures in a lowered position.

Figure 9:
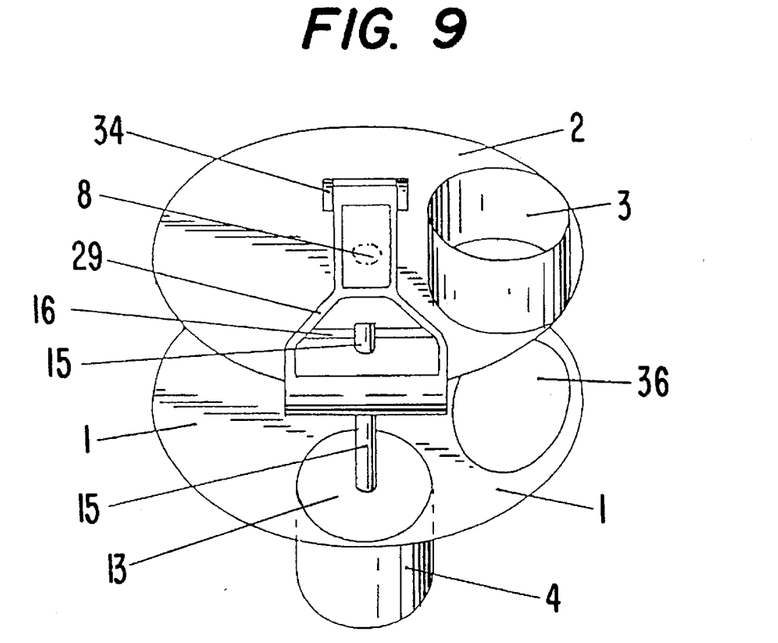
FIG. 9 is a perspective fundamental representation of the position of the brewing head shown in FIG. 4.

In FIGS. 4 and 9, the angular position of the upper and lower brewing head sections 1, 2 has not changed; however, the brewing piston 13' has been lowered into the brewing chamber 4. This is the brewing position in which the ground espresso is brewed by adding hot water via a water inlet fitting 12.

Figure 5:
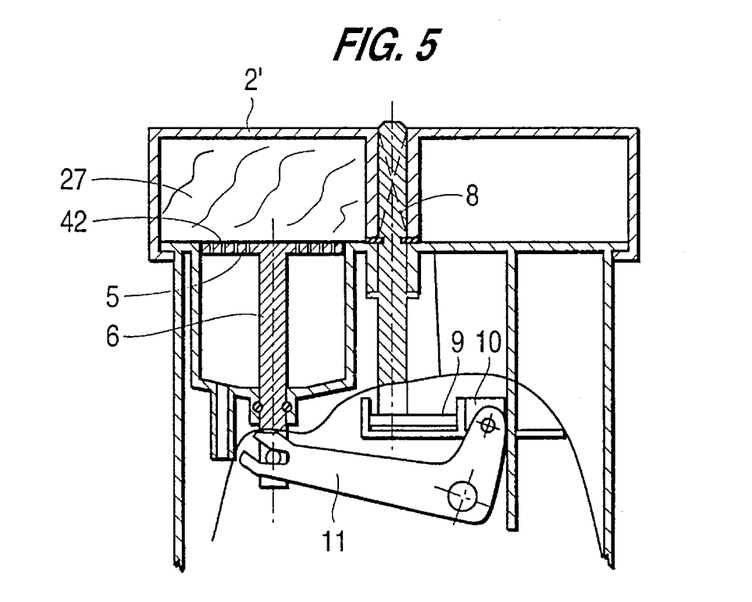
FIG. 5 is a partial sectional, elevational view, with the upper brewing head section being rotated by approximately 120° with respect to the position shown in FIG. 4, illustrating a position in which the lifting piston is raised for eliminating the cake of coffee grounds, and the clearing blade is located adjacent to the lifted coffee grounds.
Figure 10:
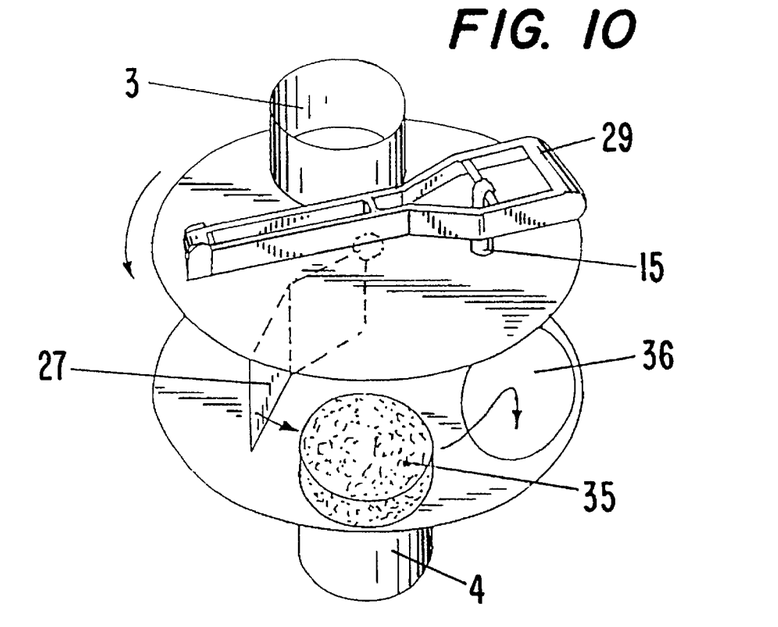
FIG. 10 is a perspective fundamental representation of the position of the brewing head shown in FIG. 5.

In FIGS. 5 and 10, the upper brewing head section 2 has been turned further by approximately 120°. In the process, the coffee grounds 35, formed as a cake, have been brought to the level of the upper side of the lower brewing head section 1 through the lifting of the lifting piston 5. Further, the rotation of the upper brewing head section 2 has caused a clearing blade 27, which is immovably secured to the upper brewing head housing 2', to be disposed adjacent to the coffee grounds 35. If the upper brewing head section 2 is now turned further to a clearing position, the clearing blade 27 transports the coffee grounds 35 off to the side, as is indicated by the arrows in FIG. 10, to a disposal opening 36 through which the coffee grounds fall for disposal.

In the following, further constructive and functional details of the brewing head will be described, with particular reference being made to FIGS. 2–6.

As mentioned, the brewing head is divided into two functional units, i.e., the upper brewing head section 2 and the lower brewing head section 1.

The upper brewing head section 2 includes fill shaft 3, a closed pivot axle bearing 41 about which the upper brewing head section rotates, clearing blade 27, and a lowering lever 29. Lowering lever 29 is pivotal about a lowering lever bearing 34 attached to upper brewing head housing 2'.

The upper brewing head section 2 further includes a detent device 30'. Detent device 30' comprises a detent handle 30, detent plate 31, detent lug 38, detent spring 32, and detent pin 33.

Further, upper brewing head section 2 includes the brewing piston 13', which comprises upper section 13 and lower section 17. Upper section 13 includes a brewing piston connecting rod 15 that is connected to lowering lever 29 by way of a connecting rod pin 16. Lower section 17 comprises a brewing sieve 18 fastened in place using a brewing sieve screw 28, a brewing piston seal 25 located around the periphery of the lower section in sealing engagement with the brewing chamber 4, a valve 19, and a suction valve 22. As best shown in FIG. 3, valve 19 and suction valve 22 are both located within a coffee outlet 14. Coffee outlet 14 is located within piston 13', and dispenses the coffee therethrough. Valve 19 comprises a valve ball 20 and valve spring 21, and suction valve 22 comprises a valve ball 23 and valve spring 24.

The lower brewing head section 1, which is fixedly connected to the machine base 40 of the housing 43, comprises the brewing chamber 4 with the water inlet fitting 12. The lower brewing head section 1 further includes the lifting piston 5, which comprises a lifting piston connecting rod 6 that passes through a base portion of the brewing chamber 4, and is connected with a control lever 11, pivotally seated in lower brewing head section 1, using a connecting rod pin 7. A connecting rod seal 26 surrounds the lifting piston connecting rod 6, to prevent leakage at the point where the connecting rod 6 passes through the base portion of brewing chamber 4.

Lower brewing head section 1 further includes the disposal opening 36, which allows for the used coffee grounds to be disposed of.

Additionally, lower brewing head section 1 includes a pivot axle 8 which is rotatably and captively seated in the center of the lower brewing head section 1. Pivot axle 8 has an upper end configured as a force-transmitting and form-fitting plug connector that rotatably fixes the upper brewing head section 2 to the pivot axle, while still allowing the upper brewing head section 2 to be pulled off the pivot axle 8.

The upper brewing head section can be rotated about the pivot axle 8 by 360° with respect to the lower brewing head section. Further, as mentioned earlier, the various function positions are fixed using detents (not shown). Pivot axle 8 supports a control cam 9 at its lower end, which is operatively connected with a sliding member 10. Sliding member 10 is seated in the lower brewing head section 1 so as to be horizontally displaceable, and controls the tilting movement of the control lever 11, and thus the up and down movement of the lifting piston 5. Thus, as upper brewing head section 2 rotates, pivot axle 8 and control cam 9 are also caused to rotate, causing a reciprocating, horizontal movement of sliding member 10, and a resulting up and down movement of lifting piston 5.

The lower brewing head section 1 and the upper brewing head section 2 are interlocked together using interlocking hooks 37 disposed on the upper brewing head section 2. The interlocking hooks 37 reach through grooves (not shown) located at the edge of the lower brewing head section 2. Thus, the upper brewing head section 1 and the lower brewing head section 2 can only be separated from one another when they are disposed in a specific position, i.e., when the interlocking hooks 37 are aligned with the corresponding grooves.

To fill ground coffee into the brewing head, fill shaft 3 is positioned above brewing chamber 4 (i.e., the fill position) and fixed in place by a detent.

After filling, the upper brewing head section 2 is rotated by approximately 120° so that the brewing piston 13' is positioned above the brewing chamber 4. This position is fixed in place by a detent. Then, by lowering the lowering lever 29, the brewing piston 13' is introduced into the brewing chamber 4 using the brewing piston connecting rod 15. The lowering process is complete when the brewing piston comes into contact with and compacts the ground coffee.

During the lowering process, the run-on slopes of the detent latches 33' push the detent lug 38, and hence the detent plate 31 against the detent spring 32 located in the detent handle 30 of the lowering lever 29. Detent lug 38 of the detent plate 31 locks into the detent latches 33' of the detent pin 33, thus fixing the brewing piston 13' in the lowered position during the brewing process. Preferably, the detent pin 33 has a plurality of detent latches 33', so as to allow the compacting of different amounts of coffee, for example, for the preparation of one cup or two cups of espresso.

For the preparation of the coffee brew, the hot brewing water is pushed into the brewing chamber 4 through the water inlet fitting 12, and through the apertures 42 of the lifting piston 5. After the water passes through the ground coffee, it passes through the brewing sieve 18, and enters the coffee collection channel 39 located in the lower section 17 of the brewing piston. Valve 19 prevents the espresso from running out of the coffee outlet 14 up to a pressure of approximately 6 bar. Valve 19 opens at a pressure of approximately 6 bar, at which point the coffee brew can run out through the coffee outlet 14.

After the brewing process, the locked detent lug 38 is released from its engagement with detent pin 33 by pulling back detent handle 30 against the force of detent spring 32, so that the brewing piston 13' may be lifted out of the brewing chamber 4 by lifting the lowering lever 29.

To dispose of the coffee grounds, the upper brewing head section 2 is turned in the same direction as was required for the filling and brewing processes, and into its initial position (i.e., the fill position). The turning process lifts the lifting piston 5 because of the aforementioned operative connection between the upper brewing head section 2, and a forced control system comprising pivot axle 8, control cam 9, sliding member 10, control lever 11, lifting piston connecting rod 6, and lifting piston connecting rod pin 7. As a result, the coffee grounds 35 are lifted to the level of a divider plane located between upper brewing head section 1 and lower brewing head section 2, and are subsequently transported to disposal opening 36 using clearing blade 27.

Figure 6:
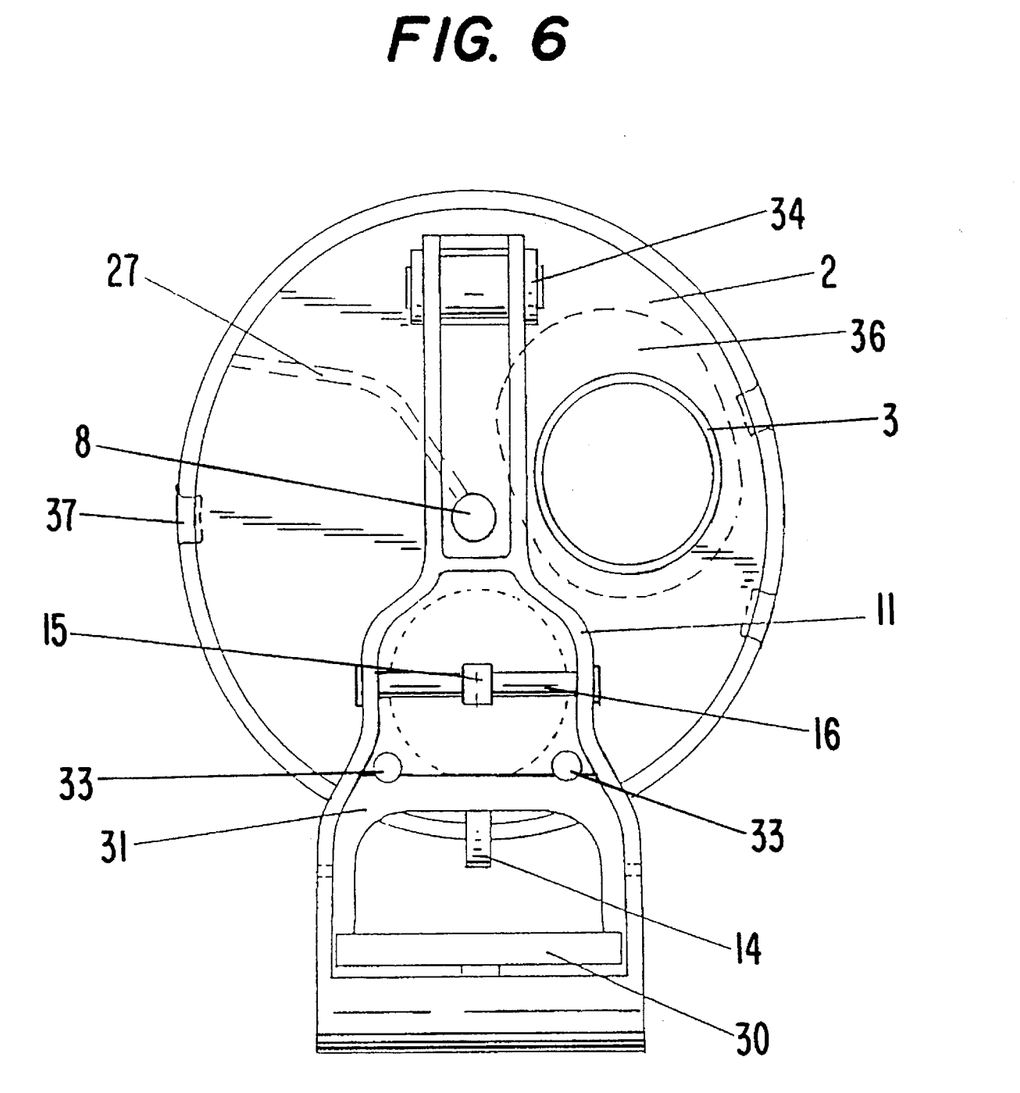
FIG. 6 is a plan view of the brewing head according to the invention.

Preferably, the clearing blade 27 is shaped as an obtuse angle, as shown best in FIG. 6. Using this configuration, the coffee grounds, which are shaped as a round cake, are surrounded by the clearing blade 27. However, contact between the clearing blade 27 and the round cake is limited to only two points. Thus, the coffee grounds are prevented from sticking to the clearing blade 27.

The control cam 9 and associated components return the lifting piston 5 to its initial (lowered) position shown in FIG. 2, while the upper brewing head section 2 is rotated. This causes a slight vacuum in the brewing chamber 4, which opens suction valve 22 and aspirates back remainders of any coffee brew disposed in the coffee outlet 14, thus preventing the coffee from dripping from the coffee outlet.

To clean the brewing head, the upper brewing head section 2 is turned to a specific position relative to the lower brewing head section 1, whereby the interlocking hooks 37 are in registration with the corresponding grooves located in the lower brewing head section 2. In this position, the upper brewing head section can 1 be lifted and separated from the lower brewing head section 2.

It will be understood that the above description of the present invention is susceptible to various modifications, changes and adaptations, and the same are intended to be comprehended within the meaning and range of equivalents of the appended claims.

What is claimed is:

1. A brewing head of an espresso coffee maker, comprising:
   (A) a housing:
   (B) a lower brewing head section fixedly attached to said housing, and including:
      a pressure sealed brewing chamber;
      a lifting piston forming a floor of said brewing chamber, and having apertures therethrough;
      a water inlet located beneath the floor of said brewing chamber, said water inlet feeding hot water through the apertures and into said brewing chamber; and
      means for moving said lifting piston to lift a cake of used ground coffee located thereon up to an upper edge of said brewing chamber after brewing the espresso; and
   (C) an upper brewing head section movable relative to said lower brewing head section, and having:
      an upper brewing head housing;
      a fill shaft located on said upper brewing head housing and being in communication with said brewing chamber when said upper brewing head section is moved to a fill position for supplying said brewing chamber with fresh ground coffee;
      a brewing piston positioned over said brewing chamber when said upper brewing head section is moved to a brewing position, said brewing piston including an espresso coffee outlet in communication with said brewing chamber when said upper brewing head section is in the brewing position for dispensing brewed espresso;
      means for plunging said brewing piston into said brewing chamber when said upper brewing head section is in the brewing position; and
      a clearing element immovably secured to said upper brewing head housing, and laterally pushing the cake off from said lifting piston after the cake is moved to the upper edge of said brewing chamber by said lifting piston, so as to clear said brewing chamber of used ground coffee when said upper brewing head section is moved to a clearing position.

2. The brewing head defined in claim 1, wherein said means for plunging comprises a lever connected to said brewing piston, said lever being operated to lower and lift said brewing piston.

3. The brewing head defined in claim 1, wherein said clearing element comprises a clearing blade having an obtuse-angled profile.

4. The brewing head defined in claim 1, wherein said upper brewing head section is configured as a carrousel rotatable about a circular path relative to said lower brewing head section.

5. The brewing head defined in claim 4, wherein said upper brewing head section is rotatable about a 360° circular path.

6. The brewing head defined in claim 4, wherein the relative rotation between said upper brewing head section and said lower brewing head section activates said moving means; said moving means constituting a forced control system.

7. The brewing head defined in claim 1, wherein said coffee outlet includes a valve located therein, said valve opening for dispensing the brewed espresso when a specific excess pressure is present in said brewing chamber.

8. The brewing head defined in claim 1, wherein said coffee outlet includes a suction valve located therein, said suction valve opening when a specific vacuum is present in said brewing chamber.

9. The brewing head defined in claim 1, wherein said brewing piston includes: a lower section having a lower side; and a brewing sieve attached to the lower side of said lower section.

10. The brewing head defined in claim 1, wherein said upper brewing head section is liftable off from said lower brewing head section.

11. The brewing head defined in claim 2, wherein said upper brewing head section comprises detent connection means engageable for holding said lever and said brewing piston in a lowered position, and being disengageable for releasing said lever and said brewing piston from the lowered position.

12. The brewing head defined in claim 1, wherein the plunging of said brewing piston compacts the ground coffee.

13. The brewing head defined in claim 1, wherein said water inlet comprises a fitting having an end attached to a base of said brewing chamber.

* * * * *